United States Patent [19]
Garver

[11] 3,797,985
[45] Mar. 19, 1974

[54] EXCESS PARISON REMOVER

[75] Inventor: Edward B. Garver, Merrionette Park, Ill.

[73] Assignee: Continental Can Company, Inc., New York, N.Y.

[22] Filed: Feb. 22, 1972

[21] Appl. No.: 228,029

[52] U.S. Cl. .......... 425/305 B, 425/310, 425/387 B, 425/806, 425/DIG. 212
[51] Int. Cl. ............................................. B29d 23/03
[58] Field of Search ........... 425/310, 311, 314, 806, 425/DIG. 208, DIG. 212, 302 B, 305 B, 387 B; 264/94, 98, 99

[56] References Cited
UNITED STATES PATENTS

| | | |
|---|---|---|
| 2,994,103 | 8/1961 | Schaich.......................... 425/806 X |
| 3,078,508 | 2/1963 | Martin .................... 425/DIG. 208 X |
| 3,488,803 | 1/1970 | Cote................................ 425/305 B |
| 3,310,834 | 3/1967 | Simpson et al. .................. 264/99 X |

*Primary Examiner*—Richard B. Lazarus
*Attorney, Agent, or Firm*—Diller, Brown, Ramik & Wight

[57] ABSTRACT

Apparatus for use in combination with an extrusion blow mold process for disposing of excess extruded tubular material not utilized within the mold. Such apparatus includes metallic means carried by the mold halves for grasping and cooling the free end of such extruded material, and means for controllably releasing such material at an appropriate location within the cycle of the molding apparatus.

8 Claims, 4 Drawing Figures

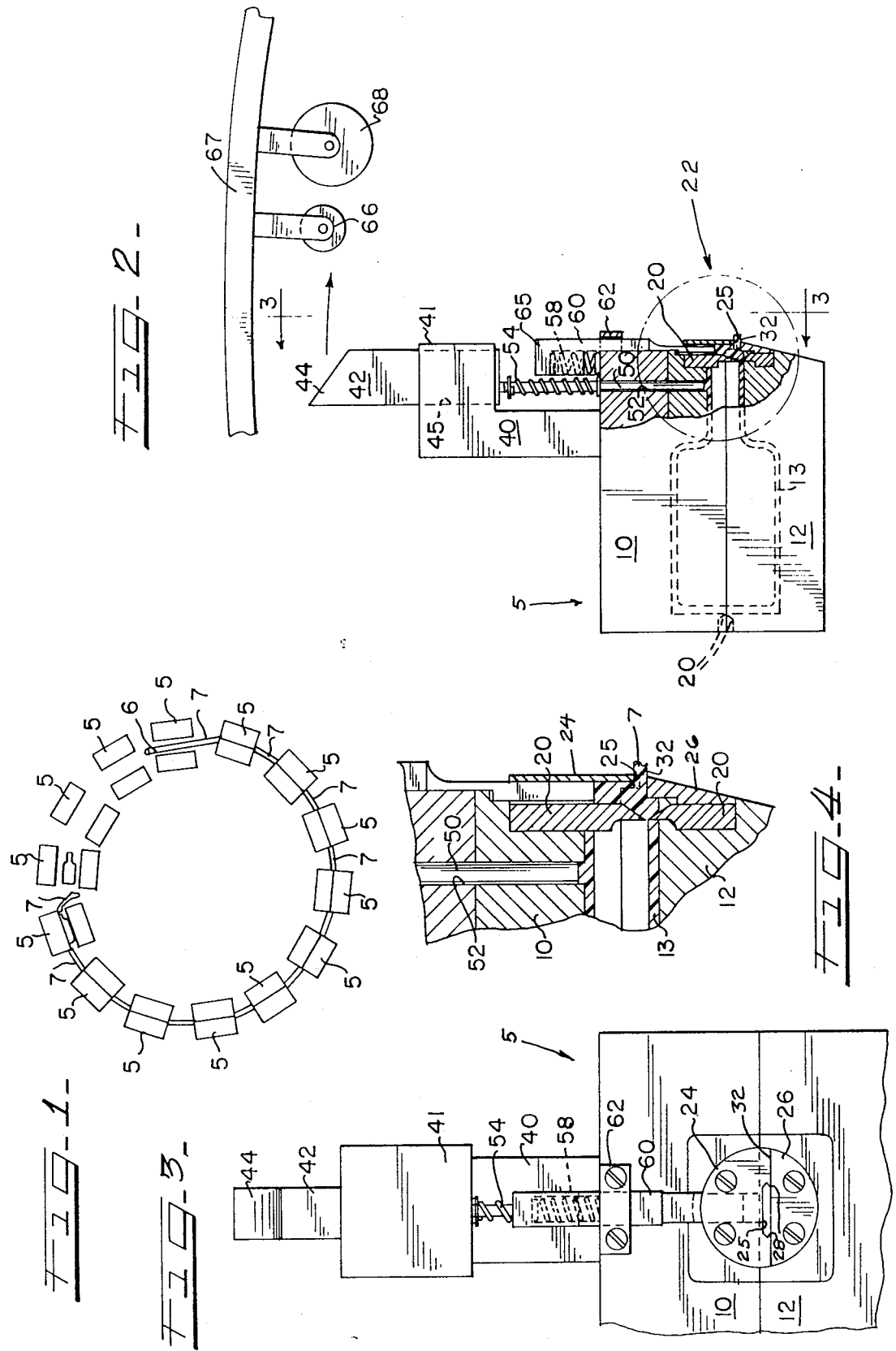

EXCESS PARISON REMOVER

BACKGROUND OF THE INVENTION

This invention relates to an extrusion blow molding apparatus in which extruded material is continuously delivered to one or more molds for forming a bottle or other article therein. More particularly, the instant invention is designed to efficiently dispose of excess material which is extruded but not utilized within the molds.

In the conventional extrusion blow molding process, plasticized material is continuously extruded from an orifice in the shape of a hollow tube. A series of mold halves carried by an appropriate machine are actuated to sequentially close about segments of such tubing, and expand same into the desired configuration. However, the tubing outside the molds and between the expanded segments represents waste material which must be recycled. In the absence of a proper disposal technique, this excess extruded material, in the form of a hot, plasticized tube, often falls upon the machine or upon formed articles as they are ejected from the molding apparatus. Since such excess material may constitute up to 30% by weight of the extruded material, a substantial recycling problem may exist.

SUMMARY OF THE INVENTION

In order to overcome such problems, the instant invention preferably includes two metal plates, one of which is attached to the exterior of each of the mold halves. As the molds close, one of the plates forces the excess extruded material into a cutout section on the other plate. Due to the high thermal conductivity of the plates, heat from the extruded material may be transferred through the plates and the mold to a cooling fluid passing therethrough. This heat transfer causes the material to be solidified and held within the cutout section. Subsequently, a knockout apparatus may be utilized to discharge such plastic material from the cutout section at an appropriate place in the cycle of the machine whereby recycling may be facilitated.

Accordingly, it is an object of the instant invention to provide means for grasping, controlling and disposing of excess extruded material not utilized by the molds in manufacturing an article. Too, it is a further object of the instant invention to facilitate the recycling of such material whereby it may be conveyed to a grinder, and then back to the extruder without being contaminated.

Finally, it is an object of the instant invention to provide a means for controlling excess extruded material in a most economical and feasible manner requiring very little maintenance.

DESCRIPTION OF THE DRAWINGS

The manner in which the objects of this invention are attained will be made clear by a consideration of the following specification and claims when taken in conjunction with the drawings in which:

FIG. 1 is a symbolic illustration of a molding apparatus with which the instant invention may be utilized;

FIG. 2 is a side elevational view, partially in section of the instant invention in its association with an expansion mold;

FIG. 3 is a front elevational view of the instant invention on an expansion mold; and FIG. 4 is an enlarged side elevational view of FIG. 2.

DETAILED DESCRIPTION

The instant invention will find particular application in an environment symbolically represented in FIG. 1 as a series of expansion molds 5 carried by a wheel of the continuous rotary type. A more detailed description of such a mold apparatus may be found in U.S. Pat. No. 2,784,452 issued to Herbert S. Ruekberg and John L. Szajna on Mar. 12, 1957. As depicted, this series of molds 5 are carried on a wheel (not shown) for rotation in a clockwise manner and are adapted to be opened and closed by simple camming means. When the molds are in their open position and moving downwardly, plasticized material 6 issuing from an extruder (not shown) is delivered in a downward direction such that the molds may close about the extruded tube. This closing welds the tubing at each end of the mold such that it can be expanded by fluid pressure in a conventional, well-known manner to form the desired configuration. Continued rotational movement permits the article to solidify, and is subsequently ejected as the molds open.

The material 7 between the molds represents excess extruded material and is normally held by the molds at the weld lines until the molds open. Such excess material remains in the form of a hot melt extended between molds during rotation of the wheel. However, upon mold opening, the excess material is unrestrained and may adhere to the molds or alternatively may attach itself to the formed article in the absence of adequate means to dispose of it. As depicted in FIG. 1, and with the utilization of the instant invention, it is anticipated that the excess extruded material 7 will be carried by the mold around the wheel to be discharged an appropriate point into a conveyor and transferred back to the extruder for recycling.

The apparatus for controllably grasping and releasing such excess material and the method of operation can be better understood with reference to FIGS. 2 and 3.

As shown, each mold 5 comprises an upper mold half 10 and a lower mold half 12 which may be opened and closed in a manner more specifically shown in the above identified Ruekberg patent. In FIG. 2, the molds are depicted in the closed position with the article 13 having been expanded by the conventional blowing process. Clamping means 20 in the form of blades are carried by the mold halves and are adapted to weld the extruded parison material at each end of the mold as the halves 10 and 12 are closed. Clamping of the tube 6 at each end to form the desired article will also cause the excess material 7 to be retained by the molds until they are opened.

To insure that such material is controllably released into a conveyor or other collection means, the instant invention utilizes a parison remover 22 to first restrain and then dispose of such material. Removal means 22 may take the form of an upper metal plate 24 and a lower metal plate 26, the upper plate having a recess 25 therein, with flanges 28 at each end of such recess. Preferably, these metal plates are attached to the molds in any conventional manner or alternatively, may form an integral portion of the mold. The lower plate 26 as depicted may take the form of a semi-circle, having an upwardly disposed flat edge 32 thereon. Thus, as the molds close, the edge 32 on the lower plate 26 will act as a compactor forcing excess material into the cutout 25 of the upper metal plate 24.

As is well known in the art, the molds may be cooled by fluid circulating therethrough, and due to the high thermal conductivity of the molds themselves, as well as the plates 24 and 26, heat may be conducted from the excess material 7 into the mold and the fluid passing therethrough. Accordingly, the excess material will rapidly rigidify within the flanges 28 of the cutout 25 holding and locking the excess material in place so as to be retained by the upper plate after the mold halves 10 and 12 are opened.

After the molds open, the formed article as well as the excess extruded material must be disposed of and discharged from the mold and the retaining means 22. Accordingly, a knockout pin 50 passes through a bore 52 within the upper mold half 10 and is biased in an outwardly direction by a spring 54. Thus, reciprocation of the pin 50 in a downward direction, (after the lower mold has moved away from the upper mold as depicted in FIG. 1) will discharge the formed article 13 from the upper mold half 10. Similarly, a knockout punch 60 is carried by the upper mold half 10 by a bracket 62 for discharging the excess material 7. Preferably, its lower end is disposed between the clamping blades 20 and the upper plate 24, and is biased outwardly by a spring 58 interposed between the upper surface of the upper mold half 10 and a flange 65 on the upper portion of the punch. Again, it should be appreciated downward reciprocable movement of the punch 60 will be effective to discharge the excess material 7 from the retaining plate 24.

Controlled release of both the formed article 13 and the excess material 7, may be effected by a cam mechanism depicted in FIGS. 2 and 3. This cam mechanism may comprise a bracket 40 carried by and attached to the upper mold half and having an L-shaped upper flange 41. Passing through a recess or aperture 45 within this flange is a cam means 42 having an upper cam surface 44. Thus, should the cam 42 be urged downwardly a first distance, the knockout pin will be reciprocated downwardly to dispose of the formed article while a further downward reciprocation of the cam 42 will cause engagement with the knockout punch 60 so as to discharge the excess extruded material.

Such downward movement may be affected by two cam rollers 66 and 68 of different radii which are fixed upon the frame 67 supporting the wheel in any conventional manner. Thus, the first roller 66, being of a reduced diameter will be affective to reciprocate the cam 42 downwardly sufficient to cause the knockout pin to discharge the container. Subsequent rotational movement of the wheel will cause the cam 42 to come in contact with the roller 68 having a greater diameter which is effective to reciprocate the cam into engagement with the punch 60 and to discharge the excess material.

Accordingly, individual conveyers may be appropriately placed below the cams rollers 66 and 68 so as to receive the formed article and the excess extruded material as they are released from the upper mold half.

As disclosed, it is preferred that the retaining means 22 be formed of a thermally conductive substance whereby the excess parison material may be rapidly rigidified. Additionally, it should be appreciated that the cutout 25 as well as the flanges may take substantially any shape as long as they can mechanically engage the plastic material upon its solidification. Alternatively, surfaces which have a higher degree of frictional resistance to movement of such excess material may be equally well acceptable.

I claim:

1. A molding apparatus comprising a mold formed in at least two halves and defining therebetween a mold cavity, said mold being of the type which opens and closes and is particularly constructed to receive therein an extruded plastic material tube and to pinch the tube closed at opposite ends of the cavity leaving at at least one end of said cavity excess plastic material, first release means for ejecting a molded article from said mold, and second release means carried by said mold for separately and later ejecting excess plastic material from said mold.

2. The molding apparatus of claim 1 wherein there are retaining means carried by said mold at said cavity one end for clasping and retaining excess plastic material attached to a selected one of said mold halves when said mold opens subsequent to a molding operation therein.

3. The molding apparatus of claim 2 wherein said second release means are operatively associated with said retaining means for ejecting the plastic material retained thereby.

4. The molding apparatus of claim 2 wherein said retaining means includes a plate carried by said one mold half and having a recess therein for receiving excess plastic material, and a second plate carried by the other mold half for compacting excess plastic material into said recess.

5. The molding apparatus of claim 4 wherein said retaining means are formed of a heat conductive material and are in heat conductive contact with the remainder of said mold for transferring heat from the excess plastic material and to rigidify the same in said notch.

6. The molding apparatus of claim 2 wherein said retaining means are formed of a heat conductive material and are in heat conductive contact with the remainder of said mold for transferring heat from the excess plastic material and to rigidify the same.

7. The molding apparatus of claim 1 together with single actuator means for said first and second release means and multiple control means for actuating said single actuator means in sequence to effect the timed actuation of said single actuator means.

8. The molding apparatus of claim 7 wherein there is a lost motion connection between said single actuator and said second release means, and said multiple control means is of the type providing for different degrees of actuation of said single actuator.

* * * * *